United States Patent [19]

Taber

[11] Patent Number: 5,686,040
[45] Date of Patent: Nov. 11, 1997

[54] METHOD FOR PRODUCING CLOSURE GASKETS

[75] Inventor: James Taber, Aurora, Ill.

[73] Assignee: White Cap, Inc., Downers Grove, Ill.

[21] Appl. No.: 144,657

[22] Filed: Oct. 28, 1993

[51] Int. Cl.$^6$ ................................................. B29C 39/10
[52] U.S. Cl. ........................................... 264/268; 264/322
[58] Field of Search ........................................ 264/299, 306, 264/319, 268, 322, 320; 425/112

[56] References Cited

U.S. PATENT DOCUMENTS

| | | | |
|---|---|---|---|
| 2,654,914 | 10/1953 | Maier | 264/268 |
| 3,547,746 | 12/1970 | Gwinner | 264/268 |
| 3,557,030 | 1/1971 | Simons | 264/268 |
| 3,689,625 | 9/1972 | Zipper | 264/268 |
| 4,088,730 | 5/1978 | Wilde | 264/268 |
| 4,304,744 | 12/1981 | Stroud | 264/268 |
| 4,497,765 | 2/1985 | Wilde et al. | 246/268 |
| 4,738,606 | 4/1988 | Christiansen | 264/266 |
| 5,104,603 | 4/1992 | Saitoh | 264/266 |
| 5,340,525 | 8/1994 | Czernik | 264/266 |

Primary Examiner—Angela Y. Ortiz
Attorney, Agent, or Firm—Lockwood, Alex, FitzGibbon & Cummings

[57] ABSTRACT

A method and an apparatus for economically manufacturing gasketed closures is described. Gasket material is placed within the closure and subsequently reformed to provide a gasket profile capable of forming an effective seal when the closure is applied to a container. The gasket material may be deposited in the closure as a hot-melt or as a preformed cut-out. The deposited material is subsequently reformed to have a desired profile by inserting a compression punch or a roller into the closure. The invention is adapted for the use of non-PVC containing materials such as certain thermoplastic elastomer materials which are non-flowable in a molten state and which may have a viscosity index of greater than about 40 meter-grams torque at 175° C. The gasket materials may optionally be foamed prior to reforming to create a finished gasket possessing a high density area more resistant to damage when the closure is applied to a container.

7 Claims, 3 Drawing Sheets

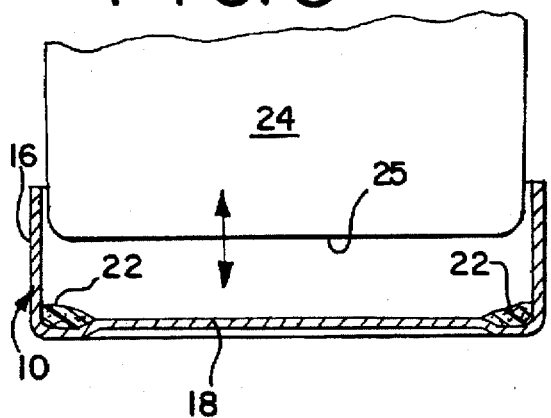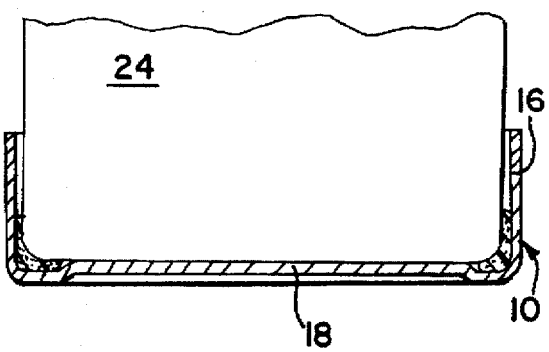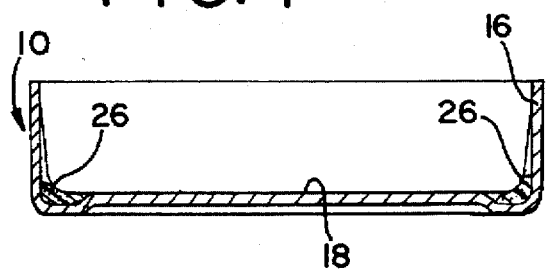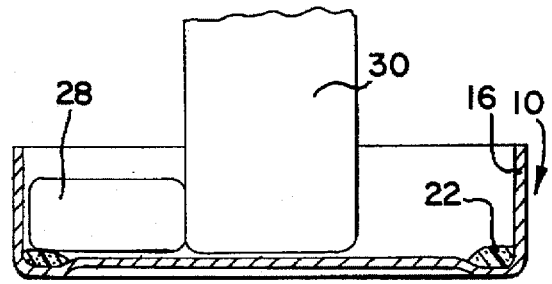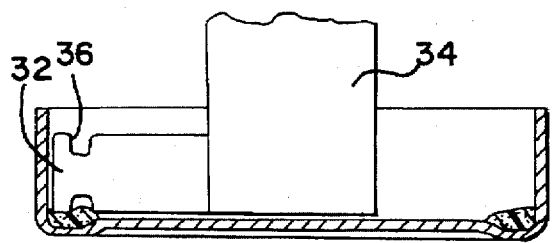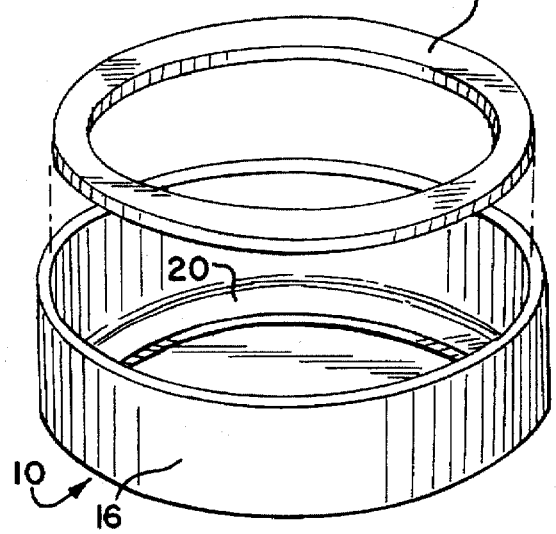

METHOD FOR PRODUCING CLOSURE GASKETS

BACKGROUND OF THE INVENTION

The present invention relates to methods and devices for gasketing closures by depositing a suitably prepared gasket material within the closure and subsequently reforming the deposited material to provide a sealing gasket bonded to the closure and having a desired geometry.

Closure gaskets are required to provide an airtight seal when a closure is applied over the opening of a container such as a beverage bottle or various wide-mouth bottles and jars used for spreads and the like. Airtight closures preserve freshness, and generally maintain the integrity of the product within the container prior to its use or consumption. Such closure gaskets generally take the form of an annular ring formed by the deposition of a suitable sealant within the closure. Suitable gasket materials include polyethylene, polypropylene, polyvinyl chloride (PVC), various thermoplastic elastomers and other plastic or polymer materials.

Gasket materials may be deposited within the closure shell by a number of techniques. For example, with the closure presented in an inverted position, the gasket material may be applied in a molten form while the closure is spun or rotated. The centrifugal force created by rotation of the closure during the application of the gasket material causes the material to be thrown radially outward to the area immediately adjacent to the skirt of the closure. A shallow channel may be provided within the closure to retain the molten material at the periphery of the inner horizontal service and adjacent the closure skirt. The use of a channel within the closure is especially useful where the gasket material is flowable in its molten state.

Seal integrity and function are obviously important considerations in the proper manufacture of gasketed closures. A well-defined gasket geometry will help achieve proper seal integrity and function, characteristics which are required for a particular closure to pass the specific tests intended to measure such properties. Although closure gaskets may be formed by the simple deposition of hot melt materials within the closure, such simple dispense and cool systems may not provide the well-defined gasket geometry or the performance required, especially in a commercial setting.

Although closure gaskets have typically been manufactured with polyvinyl chloride ("PVC"), this material may include unpolymerized vinyl chloride, a potentially serious health hazard. Furthermore, PVC is considered an undesirable component in recyclable materials. Consequently, the use of non-PVC materials in the manufacture of closure gaskets is desirable. The more recent preference in the manufacture of gaskets has focused on the use of highly viscous non-PVC gasket-forming materials. These viscous and non-flowable materials have made any reliance on centrifugal forces unrealistic. Consequently, a need has arisen for an apparatus and process by which high performance gaskets can be manufactured using viscous non-PVC materials. It would be desirable to provide a method and an apparatus for depositing these non-PVC materials within a closure as a hot melt which can subsequently be reformed to provide a desired gasket geometry. It would also be desirable to deposit a precut disk made from these non-flowable materials and subsequently reheat the material and reform it within the closure.

Accordingly, it is an object of the invention to provide a method and an apparatus for forming gaskets in closures.

It is another object of the invention to provide gasketed closures wherein the gasket material is first placed in the closure and subsequently reformed to have a desired geometry.

It is a further object of the invention to provide an apparatus and a method for altering gasket geometries.

It is still another object of the invention to manufacture closure gaskets using a wide variety of materials but especially non-PVC materials such as thermoplastic elastomers and the like.

SUMMARY OF THE INVENTION

The present invention overcomes the limitations of the prior art and achieves the discussed goals by providing an apparatus and a process for the manufacture of gaskets within closures. The invention includes means for reforming the gasket material and is well-suited to the use of non-PVC materials. Economical manufacturing techniques are used to produce a profiled closure gasket capable of forming an effective seal and the invention may be used to make gaskets in various closure types such as PT, plastic cap, plastic PT and composite closures, for example.

In one embodiment, an apparatus is provided to dispense a hot-melt gasket material into a closure from a dispensing head while the closure is rotated beneath the head in an inverted position. The hot-melt material is deposited around the periphery of the inner sealing surface of the closure and adjacent the skirt. A flattening roller or the action of the nozzle on previously dispensed material in subsequent rotations of the closure may be used to compress and partially form the gasket prior to final reformation of the hot-melt material. The closure is transported to a reformer station where a compression punch is inserted into the closure, reforming the gasket to have a desired profile or geometry.

In another embodiment, the gasket material is again dispensed into the closure as a hot-melt in the manner described above. A suitably shaped reforming roller is inserted into the closure to compress and reform the molten material into the desired profile. The roller is configured to impart the desired profile to the gasket material and may be applied to the molten gasket material at the dispensing station or at a subsequent station in the process line.

In still another embodiment of the invention, a preformed gasket liner is inserted into the closure and subsequently heated to re-soften the gasket and/or to activate adhesives. The closure can then be transported to a reforming station where the aforementioned compression punch or a roller can be applied to shape the gasket and, if needed, to assist in bonding the gasket to the closure. Where the gasket is to be bonded to a metallic surface, additional heating of the metal closure may be required to facilitate adequate bonding therebetween.

The invention can be used in manufacturing profiled closure gaskets in various plastic, metallic and composite closures. Non-PVC gasket materials can be used and particularly those thermoplastic elastomers which can be dispensed into a closure as a hot-melt under high pressures. Most preferably, the invention uses thermoplastic elastomers having a viscosity index, as determined by Brabender Plasticorder reading, of over about 40 meter-grams and typically from about 400 to about 800 meter grams torque at 175° C. Nitrogen or other agents can be used to foam the molten hot-melt material. Foaming creates a high density area in the portion of the gasket profile likely to experience the most force in use. Nitrogen is preferred over other conventional blowing agents to avoid certain taste or odor problems.

3

Other objects and advantages of the present invention will become apparent from the following Detailed Description taken in conjunction with the Drawings, in which:

BRIEF DESCRIPTION OF THE DRAWINGS

FIG. 5 is a side elevational view, in cross-section, of the closure of FIG. 4, showing a compression molding punch being inserted therein;

FIG. 6 is a side elevational view, in cross-section, of the closure of FIG. 5, showing a molding punch reforming the gasket material;

FIG. 7 is a side elevational view, in cross-section, of the closure of FIG. 6 and showing the gasket material after reformation thereof;

FIG. 8 is a side elevational view, in cross-section, of a closure having molten gasket material deposited therein and having a paddle roller inserted to flatten the molten material in accordance with the invention;

FIG. 9 is a side elevational view, in cross-section of a closure and illustrating the reformation of gasket material using a reforming roller;

FIG. 10 is an exploded perspective view showing a preformed cut-out suitable for insertion within the depicted closure;

DETAILED DESCRIPTION OF THE PREFERRED EMBODIMENTS

The invention provides a method and an apparatus to economically manufacture gasketed closures by placement of the gasket material within the closure and subsequently reforming the material to provide a gasket profile capable of forming an effective seal when the closure is applied to a container. The gasket material may be deposited within the closure as a hot-melt or as a preformed cut-out and is subsequently reformed. Non-PVC materials may be used and the invention is especially adapted to the use of thermoplastic elastomer materials having a viscosity index of greater than about 40 meter-grams torque at 175° C. The gasket materials may optionally be foamed with nitrogen prior to dispensing to create a high density area within the finished gasket profile.

Figure 1:
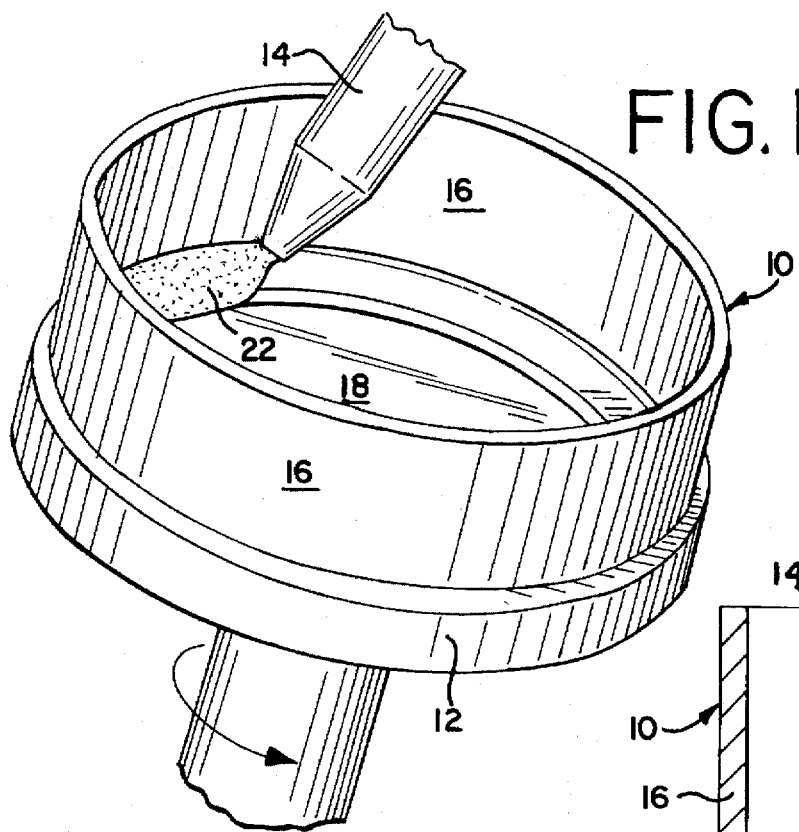
FIG. 1 is a perspective view, in section, of an apparatus for depositing hot melt materials into a closure in accordance with the present invention.
Figure 2:
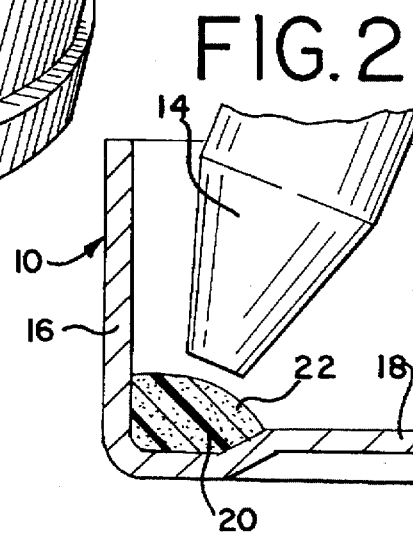
FIG. 2 is a side elevational view, in cross-section, illustrating the placement of hot-melt materials within a closure in accordance the invention.
Figure 3:
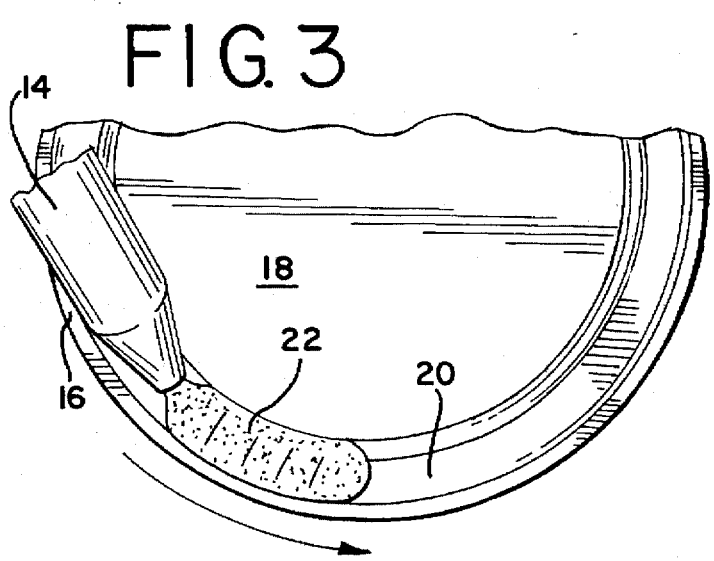
FIG. 3 is a top plan view, in section, illustrating the placement of hot-melt materials within a closure according to the invention.
Figure 4:
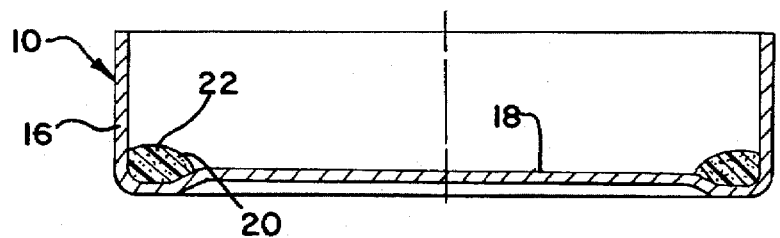
FIG. 4 is a side elevational view, in cross-section, of a closure after the deposition of a hot-melt material therein.

Referring now to the figures, FIG. 1 illustrates an apparatus useful in the deposition of hot-melt thermoplastic materials into a closure. The closure 10 is positioned at a hot-melt dispensing station on a rotatable tray 12 in an inverted position beneath a hot-melt dispensing head 14. As shown in FIGS. 2 and 3, the dispensing head 14 extends into the closure 10 and adjacent the skirt 16 at the junction of the closure's horizontal sealing surface 18 and the skirt 16. In this position, the dispensing head 14 will dispense the viscous hot-melt into a rotating closure 10 along the periphery of the surface 18 where the finished gasket will lie. The dispensing head 14 is preferably oriented at an acute angle relative to the sealing surface 18 to deposit a ribbon of hot-melt into the rotating closure in a manner which minimizes the risk of breaking the ribbon of material as it exits the head 14 and adheres to the rotating surface 18.

As shown in FIG. 2, the closure 10 may include a track 20 formed along the periphery of the horizontal surface 18 to aid in the proper placement of the hot-melt within the closure. When present, the channel 20 provides a subtle trough structure to retain the hot-melt material therein. The dispensing head 14 includes a nozzle opening of suitable configuration for dispensing a ribbon of hot-melt material therethrough. A more rectangular or oblong opening will provide a flat ribbon of material which may be preferred where, for example, a flat gasket is required. By controlling the configuration of the ribbon, further processing of the material can be minimized to a certain extent. Various orifice configurations can be employed as known to those skilled in the art.

After the hot-melt has been deposited in the closure 10, the dispensing head 14 is withdrawn. The deposited gasket material 22 will remain for a time in a molten state, retaining the configuration of the dispensing orifice of the head 14. The closure 10 is conveyed from the dispensing station to a reformer station to reshape the molten material 22. It is worth noting, however, that metal closures may also require some additional heating to adequately bond the hot-melt material 22 to the closure 10. The amount of heat required and the location of its application may be dependant on the closure style and may be determined in a known manner. Since the closure is rotated during the deposition of the hot-melt, localized heating may be applied to the closure during the deposition step to adequately heat the closure and provide conditions suitable for forming a strong closure-to-gasket bond. Alternatively, a separate heating station can be incorporated in the process line, and, additional heat may even be applied after the molten material has been reformed.

The invention contemplates the reformation of the hot-melt material 22 in one of several ways. While not intending to be limited to a specific reformation apparatus or technique, different embodiments of reforming devices and methods will now be described. In one aspect of the invention, reformation of the molten gasket material 22 may be accomplished by the application of a compression molding punch 24, shown in one form in FIGS. 5–6. The punch 24 is dimensioned to fit within the closure 10 and includes a molding or compression surface 25 thereon. The compression surface 25 is configured to impart a desired profile to the gasket material 22 with the specific configuration dependent upon the application intended for the finished closure.

For example, the punch 24 includes a flat compression surface 25 which is slightly rounded at its outermost extent to provide a relatively flat gasket which extends partially up the inner skirt 16 with some of the gasket material 22 bonding to the inner surface of the skirt. Such a gasket configuration is advantageous in certain closure applications, such as PT closures, because the portion of the gasket formed around the outer radius of the closure provides a means for restraining gasket movement due to container seal deformation.

Figure 11:
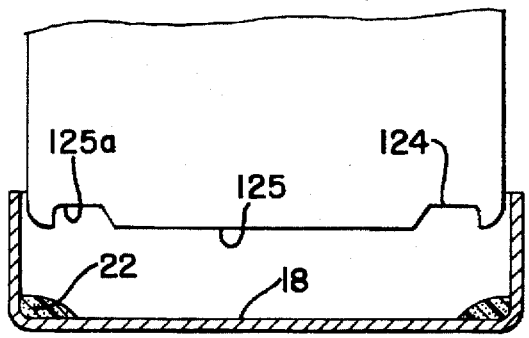
FIG. 11 is a side elevation view, in cross section, of a closure and showing another embodiment of an compression molding punch being inserted within the closure.
Figure 12:
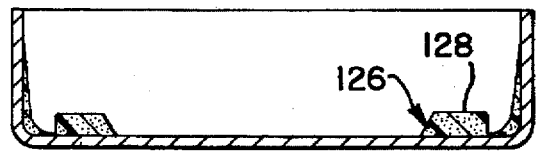
FIG. 12 is a side elevation, in cross section, of the closure of FIG. 11 showing the gasket profile after reformation thereof.

Another embodiment of a compression mold punch is shown in FIGS. 11 with an alternate gasket profile shown in FIG. 12. The punch 124 includes a molding surface 125 having an annular notch 125a extending around its circumference. The punch 124 may be positioned within the closure 10 to compress the molten gasket material 22 under relatively low pressures and forcing the material 22 into the notched area 125a of the punch 124. When the punch 124 is withdrawn, the resulting gasket 126 will assume the form imposed on it by the molding surface 125. A sealing surface 128 extends above the surface 18 of the closure 10. The sealing surface 128 will provide a contact surface to coact with the top surface of a container to provide an adequate seal between the closure 10 and the container.

In certain gasket applications, it may be desirable to add a blowing agent to the gasket material and prior to dispensing the material as a hot-melt. The foamed hot-melt material will provide a gasket which includes areas of varying specific gravity. A high density area along the principal sealing surface of the gasket is desirable to strengthen the finished gasket in the area thereof which will experience the greatest force when the closure is applied to a container. In the gasket 126, for example, the sealing surface 128 may be formed with a higher density than the remainder of the gasket. The formation of such a high density area is especially advantageous in closures required to meet certain standards. PT closures, for example, may be required to pass a stacking test. Where the density of the sealing surface 128 of the profile 126 is too low, an undesirable condition known as "cut through" can occur when the gasket contacts the top surface of a glass finish. Improving the gasket density in this area will help to prevent this condition.

In another aspect of the invention, a paddle roller 28 (FIG. 8) may be used to flatten the molten material 22 within the closure 10. The paddle 28 is rotatably mounted on a shaft 30 so that the paddle 28 is rotatable about a horizontal axis perpendicular to the shaft 30. The shaft 30 and paddle 28 are sized to be inserted within the inverted closure 10 in the manner shown in FIG. 8, for example. The paddle 28 may be inserted within the closure 10 during the above-discussed dispensing step while the closure 10 is rotating on the stand or table 12. In this arrangement, the paddle 28 remains stationary within the rotating closure 10 while the molten material 22 passes under the paddle 28. The paddle 28 compresses the molten material 22 and, depending on the application, the gasket may require no further shaping. Alternatively, the paddle 28 can be applied to the gasket during the dispensing step followed by further reformation of the material 22 at a molding station in a manner consistent with the aspects of the invention described herein.

In still another aspect of the present invention, a reforming roller 32 (FIG. 9) can be used to flatten the molten material 22 while simultaneously completing the reformation of the gasket. Such a reforming roller 32 is rotatably mounted on a shaft 34 and the roller and shaft are dimensioned to be inserted within the closure 10. The roller reformer 32 can flatten and shape the molten material 22 either at the dispensing station or at a subsequent reforming station. Most preferably, the closure 10 is rotated while the reformer 32 is positioned within the inverted closure 10 with the shaft 34 positioned within the center of the closure 10 over the horizontal surface 18. When inserted in the closure, the reformer 32 extends from the shaft 34 to the annular skirt 16, as shown in FIG. 9.

A profiling groove 36 is provided in the surface of the roller 32 to impart the desired profile geometry to the gasket material. Rotation of either the closure 10 or the shaft 34 will drive the gasket material 22 under the reformer 32 to simultaneously flatten and shape the material 22 into the desired gasket geometry. In the embodiment of FIG. 9, the specific configuration of the rolling reformer 32 will provide a sealing surface in the finished gasket similar to the surface 128 of the gasket of FIG. 12, for example. Other desired geometries or profiles may be formed in the finished gasket by providing a suitably configured roller. Gasket thickness can be gauged by controlling the volume of material discharged into the groove 22 of the closure 10 or by careful control of the gap between the roller 32 and the horizontal closure surface 18.

In still another aspect of the invention, a precut gasket disk 38 is shown in FIG. 10 in an exploded relation to the closure 10. In lieu of a hot-melt dispensing step, the precut disk 38 may be inserted within the closure to lay within the track 20 and adjacent the skirt 16. The inserted disk will require further processing to adhere the disk 38 to the closure and/or to alter the gasket geometry. After insertion, the closure 10 and the disk 38 are heated in an oven such as an RF, microwave, induction, infrared, conduction or convection oven, for example. The disk 38 is heated to soften the gasket material and possibly to activate adhesives, if present. Once the disk has been adequately softened, the closure can be transported to a reforming station. A compression punch such as the punch 24 of FIG. 5, for example, can be employed to flatten the molten material and provide a finished gasket suitable for a PT style closure, for example. Alternatively, the paddle roller 28, the roller reformer 32 or the compression punch 124 can be employed to reform the disk 38 in the manner discussed herein.

Figure 13:
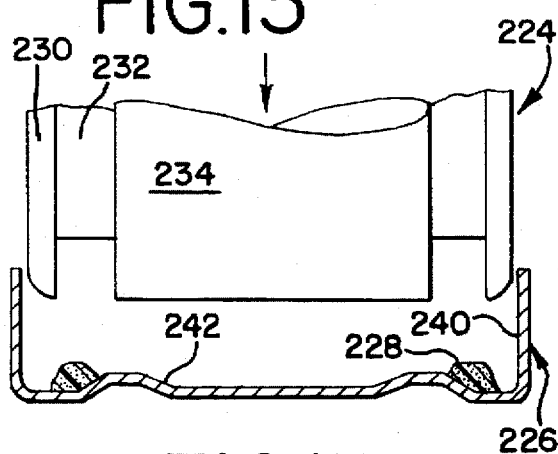
FIG. 13 is a side elevational view, in cross section, of a closure and showing still another embodiment of a compression molding punch being inserted within the closure.
Figure 14:
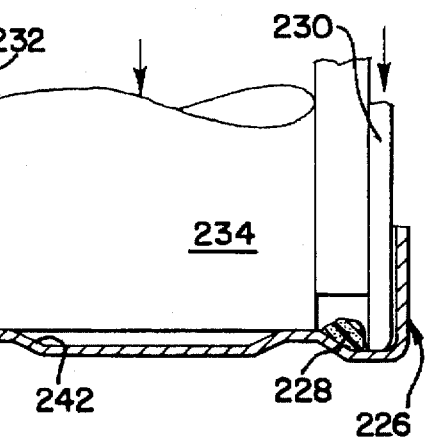
FIG. 14 is a side elevational view, in cross section, of the closure and molding punch of FIG. 13, showing the punch further inserted within the closure.
Figure 15:
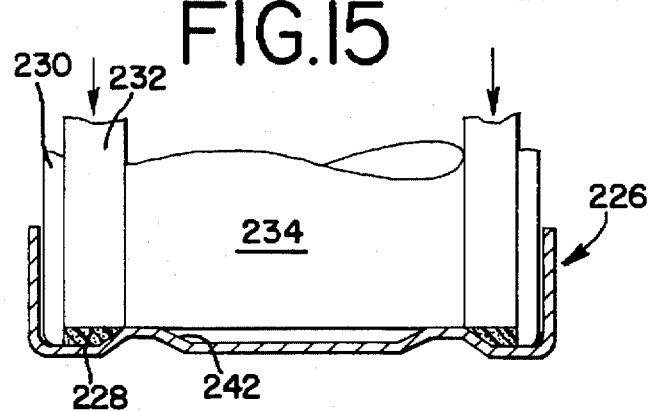
FIG. 15 is another side elevational view, in cross section, of the closure and molding punch of FIGS. 13 and 14 and further illustrating the reformation of gasket material within the closure.

Yet another aspect of the invention is shown in FIGS. 13, 14 and 15 where a three-piece molding punch 224 is shown in operation with a closure 226 having an amount of molten gasket material 228 deposited therein. The molding punch 224 includes three concentric compression rings; an outer ring 230, an intermediate ring 232 and an inner ring 234. Preferably, these rings 230, 232 and 234 can be positioned somewhat independently of one another to define a gasket molding surface with specific shut off points. As shown in FIG. 14, the outer and inner compression rings 230 and 234, respectively, contact the inner surfaces of the closure to form shut off points 236 and 238, thereby containing the flow of gasket material and limiting the amount of resulting flash during the molding operation.

Figure 16:
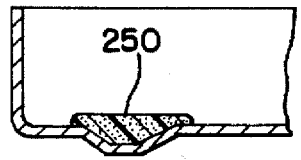
FIG. 16 is an elevated fragmentary cross-sectional view of a preferred RTS style gasket formed in accordance with this invention as illustrated by the sequence of FIGS. 13–15.
Figure 17:
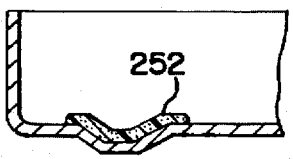
FIG. 17 is an elevated fragmentary cross-sectional view of another preferred RTS style gasket formed in accordance with this invention.
Figure 18:
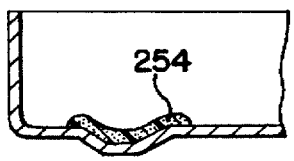
FIG. 18 is an elevated fragmentary cross-sectional view of still another preferred RTS style gasket shaped and formed in accordance with this invention.

As shown in FIG. 15, once the outer ring 230 and the inner ring 234 are positioned in the closure 226, the intermediate compression ring 232 can then be vertically advanced to compress the molten gasket material 228 into a desired gasket configuration. Compression of the gasket material 228 by the intermediate ring 232 also assists in the bonding of the gasket material 228 to the closure. Those skilled in the art will appreciate that the embodiment shown in FIGS. 13, 14 and 15 is applicable to all styles of closures. However, different styles of closures may require modifications to the molding punch 224 of FIGS. 13, 14 and 15. Specifically, different styles of closures will require a molding punch with different shutoff points. For example, the RTO style closure 226 of FIGS. 13, 14 and 15, as well as the RTS style closures 250, 252 and 254 of FIGS. 16, 17 and 18, respectively, require only a small ring of material 228 to form a gasket. A PT style closure, however, will require shut off points high on the inside wall 240 of the closure 226 as well as a shut off point on the panel 242.

Regarding materials, the use of certain non-PVC materials may be preferred. Thermoplastic elastomers having a viscosity index, as measured on the Brabender Plasticorder, greater than about 40 meter-grams torque can be used, including thermoplastic elastomers having a viscosity index of between about 400 and about 800 meter-grams torque at 175° C. These materials are non-flowable in their molten state and will not demonstrate any significant shift in position or in shape when deposited within a closure. Hot-melt deposition of these materials within a closure must be under high pressures. Pressures of from about 2000 psi to about 5000 psi have been suitable although pressures in excess of 5000 psi may be required for some materials.

Gaskets made according to the invention may be foamed. While nitrogen is a preferred blowing agent in providing foamed gasket materials, other blowing agents may also be used. Some caution should exercised in selecting a blowing agent which does not cause taste or odor problems.

Those skilled in the art will appreciate that the various reforming tools described herein are merely exemplary of numerous possible designs for tools capable of reforming a molten thermoplastic material. The present invention contemplates the use of many different reforming tools and it is intended that the scope of the invention extend to cover any apparatus, system or process for reforming highly viscous thermoplastic materials after such materials have been deposited along the periphery of the sealing surface of a closure shell and adjacent the skirt. Any such technique which produces a gasket capable of forming an effective seal when the closure is applied to a container is contemplated as within the scope of the invention.

While the preferred embodiments of the invention have been discussed and described above, those skilled in the art will appreciate that various changes and modifications can be made to the described embodiments without departing from the true spirit and scope of the invention, as defined in the claims.

What is claimed is:

1. A process for producing a sealing gasket within a closure shell, said closure shell including a circular panel having an inner surface and an annular skirt extending around the periphery thereof, said process comprising:
    providing a thermoplastic elastomer material capable of forming said sealing gasket within said closure shell, said thermoplastic elastomer material being non-flowable in a molten state and having a viscosity index between about 40 and about 800 meter-grams torque at 175 degrees Centigrade;
    heating said thermoplastic elastomer material to a temperature at which it is in said molten state;
    depositing said thermoplastic elastomer material as hot-melt under a pressure of at least about 2000 pounds per square inch onto the periphery of the inner surface of said panel adjacent said skirt;
    reforming said thermoplastic elastomer material to provide a finished gasket having a profile capable of forming an effective seal when the closure shell is applied to a container.

2. The process of claim 1 wherein said thermoplastic elastomer material is non-flowable in a molten state and has a viscosity index between about 400 and 800 meter-grams torque at 175 degrees Centigrade.

3. The process of claim 1, wherein said thermoplastic elastomer material is heated immediately prior to being deposited into said closure shell.

4. The process of claim 1, wherein said thermoplastic elastomer is deposited into said closure shell as a pre-cut annular disk.

5. The process of claim 4, wherein said thermoplastic elastomer is heated in an oven after being deposited into said closure shell.

6. The process of claim 1, wherein said reforming of said thermoplastic elastomer material is accomplished by inserting a molding tool into the closure shell to compress the molten thermoplastic elastomer material into a gasket configuration suitable for forming an effective seal when the closure is applied to a container.

7. The process of claim 6, wherein said molding tool is a compression punch comprising concentric compression rings including an outer member and an intermediate member and an inner member, said outer member and said inner member cooperating to form shut off points to contain said thermoplastic elastomer material therebetween, said intermediate member moving from a raised position to a lowered position to compress said thermoplastic elastomer material into said gasket configuration.

* * * * *